(12) United States Patent
Bhunia et al.

(10) Patent No.: US 11,899,827 B2
(45) Date of Patent: Feb. 13, 2024

(54) ESTABLISHING TRUST IN UNTRUSTED IC TESTING AND PROVISIONING ENVIRONMENT

(71) Applicant: University of Florida Research Foundation, Incorporated, Gainesville, FL (US)

(72) Inventors: Swarup Bhunia, Gainesville, FL (US); Atul Prasad Deb Nath, Gainesville, FL (US); Kshitij Raj, Gainesville, FL (US); Sandip Ray, Gainesville, FL (US); Patanjali Sristi Lakshmiprasanna Sriramakumara, Gainesville, FL (US)

(73) Assignee: UNIVERSITY OF FLORIDA RESEARCH FOUNDATION, INCOPORATED, Gainesville, FL (US)

( * ) Notice: Subject to any disclaimer, the term of this patent is extended or adjusted under 35 U.S.C. 154(b) by 33 days.

(21) Appl. No.: 17/662,399

(22) Filed: May 6, 2022

(65) Prior Publication Data
US 2022/0374553 A1 Nov. 24, 2022

Related U.S. Application Data

(60) Provisional application No. 63/187,870, filed on May 12, 2021.

(51) Int. Cl.
*G06F 21/75* (2013.01)
*G06F 21/74* (2013.01)

(52) U.S. Cl.
CPC .............. *G06F 21/75* (2013.01); *G06F 21/74* (2013.01)

(58) Field of Classification Search
CPC .................................. G06F 21/75; G06F 21/74
See application file for complete search history.

(56) References Cited

U.S. PATENT DOCUMENTS 11,151,254 B2 * 10/2021 Simmons ............... H04L 9/3247
11,308,562 B1 * 4/2022 Ran ........................ G06Q 40/12
(Continued)

*Primary Examiner* — Viral S Lakhia
(74) *Attorney, Agent, or Firm* — Alston & Bird LLP

(57) ABSTRACT

A system for secure testing and provisioning of an integrated circuit (IC) includes, in part, a secure reconfigurable key provisioning architecture (SLEEVE) module disposed in the IC, and a secure asset provisioning hardware entity (SAPHE) module. The IC may include, in part, a modified IEEE 1500 wrapper to control its operation modes. The SLEEVE module may include, in part, an encoding/decoding module and an unlocking module. The encoding/decoding module may include, in part, a decode key stream cipher module, an encode key stream cipher module, Seed Key programmable linear-feedback shift registers (LFSRs), Initialization Vector (IV) LFSRs, and configuration registers. The encoding/decoding module may be configured to generate key bits for decoding and encoding inputs and outputs of the IC. The unlocking module may include, in part, a pattern matching block and a counter. The unlocking module may be configured to enable write access to the configuration registers. The SAPHE module may include, in part, a microcontroller, a logging module, a provisioning module, and a communications module. The SAPHE module may be configured to interact with the IC to obtain a status of the IC during a testing and provisioning process. The logging module may include, in part, dedicated memory segments to store values for configuring the SLEEVE module and unlocking patterns for enabling write access to the configuration registers. The provisioning module may include, in part, a content accessible memory (CAM) module to store encrypted test patterns and encoded asset provisioning vectors for intellectual property (IP) blocks in the IC.

10 Claims, 10 Drawing Sheets

(56) References Cited

U.S. PATENT DOCUMENTS

| | | | |
|---|---|---|---|
| 11,321,629 B1* | 5/2022 | Rowan | G06N 20/00 |
| 11,561,963 B1* | 1/2023 | Horesh | G06F 16/2379 |
| 11,595,471 B1* | 2/2023 | Bhattacharya | G06F 9/5083 |
| 11,783,062 B2* | 10/2023 | Lounsberry | G06F 21/6218 |
| | | | 726/30 |
| 2022/0114266 A1* | 4/2022 | Atkinson | G06F 16/27 |
| 2022/0269754 A1* | 8/2022 | Cardo Sanchez | G06F 21/105 |
| 2023/0188491 A1* | 6/2023 | Iceton | H04L 51/42 |
| | | | 709/206 |

\* cited by examiner

ESTABLISHING TRUST IN UNTRUSTED IC TESTING AND PROVISIONING ENVIRONMENT

CROSS-REFERENCE TO RELATED APPLICATION

The present application claims benefit under 35 USC 119(e) of U.S. Application Ser. No. 63/187,870, filed May 12, 2021, which is incorporated herein by reference in its entirety.

TECHNICAL FIELD

The present application relates to integrated circuits, and more particularly to secure testing and provisioning of integrated circuits.

BACKGROUND

As the semiconductor industry moves toward sub-nanometer scaling of transistor fabrication technologies, the design complexity and fabrication cost of microelectronic chips continue to increase at an unprecedented rate. Since their inception, transistors have shrunk significantly over time and continue to scale down in size. The shrinkage of transistors enables integrated circuit (IC) designers to incorporate increasingly complex circuitry in ICs and system on chips (SoCs) to improve performance while keeping the power and area overhead low. However, fabricating chips at the nano and sub-nano scale is expensive. The cost to build cutting-edge fabrication labs is almost prohibitive to many semiconductor corporations and participating nation-states. Studies show that the cost of building a state-of-the-art fabrication facility can be as high as 15-20 billion dollars. Consequently, the majority of the chip manufacturing companies rely on third-party foundries.

Outsourcing chip fabrication to such foundries comes with many critical security risks. Adoption of outsourced design strategy, along with post-fabrication, black-box nature of chips, compels the OEMs (Original Equipment Manufacturers) to trust remote foundries. However, neither the foundries nor the testing sites can be fully trusted. Malicious entities at untrusted fabrication sites and testing locations can exploit a diverse set of attacks to steal design secrets, IPs, and assets, clone and overproduce ICs for illegal purposes, maliciously alter the chips, and eventually compromise the security of the entire supply chain. Organizations with niche application domains such as U.S. Department of Defense (DoD) adopt specialized approach such as trusted foundry program to mitigate these threats. However, for most of the corporations in the present-day semiconductor industry, it is not feasible to guarantee such security assurance of outsourced ICs by implementing a trustworthy chain of custody at every design phase.

Over the past few years, several defense techniques have been proposed to mitigate the attack surfaces of untrusted foundries and testing sites. The solutions include design obfuscation via logic locking, physically unclonable function (PUF) based authentication techniques, and IC watermarking. In logic locking-based defense mechanisms, the IPs are locked by inserting additional finite state machines (FSMs) or strategically placing keys gates that locks design functionality.

PUF-based unique IDs are used to lock and unlock ICs in an untrusted environment. Hardware watermarking techniques have also been developed to facilitate detectability and ownership of IPs of the SoC via embedded watermarks. While the existing techniques differ in their implementation strategy, the overarching goal of these mechanisms is to limit the attacker's access to original design during fabrication and testing and consequently, prevent the attackers from stealing IC secrets and assets, tampering, cloning and overproducing, and entering compromised chips into the supply chain from untrusted foundry and testing facilities.

A known shortcoming in existing methodologies for IC protection is that the chips need to be unlocked for functional testing as well as provisioning of design secrets and assets at the testing facilities. Accordingly, OEMs are limited in using the existing methods to protect the chips in an untrusted environment. The untrusted entities at the foundry and testing site can exploit this vulnerability in multifarious ways—from cloning and overproduction to stealing design secrets illegally or by simply procuring additional keys from manufacturers with the claim of low yield and failed chips.

The security threats of a rogue testing facility that is in collusion with an untrusted foundry remains a challenge. In particular, existing locking, encryption, and authentication based mechanisms are ineffective in mitigating attacks.

SUMMARY

A system for secure testing and provisioning of an integrated circuit (IC), in accordance with some embodiments of the present disclosure, includes, in part, a secure reconfigurable key provisioning architecture (SLEEVE) module disposed in the IC, and a secure asset provisioning hardware entity (SAPHE) module. In some embodiments, the SAPHE module is configured to interact with the IC to obtain a status of the IC during a testing and provisioning process.

In some embodiments, the system further includes, in part, a security wrapper disposed in the IC. In some embodiments, the security wrapper includes, in part, an IEEE 1500 wrapper and an extra input port coupled to the IEEE 1500 wrapper. In some embodiments, the security wrapper is configured to control operation modes of the IC based at least in part on a signal applied to the extra input port.

In some embodiments, the SLEEVE module includes, in part, an encoding/decoding module. In some embodiments, the encoding/decoding module includes, in part, a decode key stream cipher module, an encode key stream cipher module, Seed Key programmable linear-feedback shift registers (LFSRs), Initialization Vector (IV) LFSRs, and configuration registers.

In some embodiments, the SLEEVE module further includes, in part, an unlocking module. In some embodiments, the unlocking module comprises a pattern matching block and a counter.

In some embodiments, the SAPHE module includes, in part, a microcontroller, a logging module, a provisioning module, and a communications module. In some embodiments, the logging module includes, in part, dedicated memory segments. The dedicated memory segments may be configured to store values for configuring the SLEEVE module. The dedicated memory segments may also be configured to store one or more unlocking patterns for enabling write access to the configuration registers of the SLEEVE module. In some embodiments, the provisioning module includes, in part, a content accessible memory (CAM) module. The CAM module may be configured to store encrypted test patterns and encoded asset provisioning vectors for each intellectual property (IP) block disposed in the IC.

A method for secure testing and provisioning of an IC, in accordance with some embodiments of the present disclosure, includes, in part, configuring a secure asset provisioning hardware entity (SAPHE) module to apply unlocking key patterns to the IC, configuring a secure reconfigurable key provisioning architecture (SLEEVE) module disposed in the IC to, upon receiving the unlocking key patterns, generate key bits for decoding and encoding inputs and outputs of the IC, configuring the SAPHE module to apply a set of encoded test patterns to the SLEEVE module, configuring the SAPHE module to receive, from the IC, a first set of responses to the set of encoded test patterns, and configuring the SAPHE module to determine whether the SLEEVE module is properly configured based at least in part on the first set of responses.

In some embodiments, the method further includes, in part, configuring the SAPHE module to, upon determining that the SLEEVE module is properly configured, apply a set of encoded provisioning vectors to the SLEEVE module, configuring the SAPHE module to receive, from the IC, a second set of responses to the set of encoded provisioning vectors, and configuring the SAPHE module to determine whether a provisioning process of the IC is successful based at least in part on the second set of responses. In some embodiments, the first set of responses and the second set of responses comprise encoded responses.

In some embodiments, the method further includes, in part, configuring the SAPHE module to fetch the set of encoded test patterns from a provisioning module disposed in the SAPHE, and configuring the SAPHE module to fetch the set of encoded provisioning vectors from the provisioning module.

In some embodiments, the method further includes, in part, configuring the SAPHE module to, upon determining the success of the provisioning process, apply a set of encoded unlocking keys to the IC to unlock the functionality of the IC, and configuring the SAPHE module to receive a status of the IC after a testing process is applied to the IC. In some embodiments, the set of encoded unlocking keys comprises a first set of encoded unlocking keys for unlocking a logic locked intellectual property (IP) block disposed in the IC. In some embodiments, the set of encoded unlocking keys comprises a second set of encoded unlocking keys for unlocking a physically unclonable function (PUF) IP block disposed in the IC.

In some embodiments, the method further includes, in part, configuring the SAPHE module to apply a set of control signals to a security wrapper disposed in the IC to enable a provisioning mode.

In some embodiments, the method further includes, in part, configuring the SAPHE module to fetch the unlocking key patterns from a logging module disposed in the SAPHE module.

In some embodiments, the method further includes, in part, configuring the SAPHE module to establish a secure channel with a design house via a communication module disposed in the SAPHE. This allows the design house to update security policies, change the configuration, and/or access audit information obtained from the IC after the testing process.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

In accordance with embodiments of the present invention, security in testing of an integrated circuit (IC) is provided amid the presence of malicious entities in a zero trust testing environment. In accordance with one embodiment, protection of intellectual property (IP) assets or IP blocks embedded in an IC is achieved by providing a system and a method that prevent an attacker in an untrusted testing facility from gaining access to sensitive information such as challenge vectors, unlocking keys, feature bits, etc. and that prevent the attacker in an untrusted foundry from gleaning critical structural information about the provisioning architecture. In accordance with another embodiment, protection of intellectual property assets embedded in an IC is achieved by providing a physically secure enclosure that isolates the IC from attackers when the IC is provisioned with assets from remote cloud-based servers that would otherwise render the IC highly susceptible to asset leakage attacks.

Embodiments of the present invention operate in concert with state-of-the-art security measures, such as root-of-trust modules, authentication mechanism (e.g., PUF-based authentication techniques), and logic locking techniques that facilitate the implementation of comprehensive solutions against the attacks stemming from rogue testing sites and colluding foundries. Embodiments of the present invention enable the design house to perform provisioning securely and seamlessly without drastically altering the existing testing framework.

Figure 1:
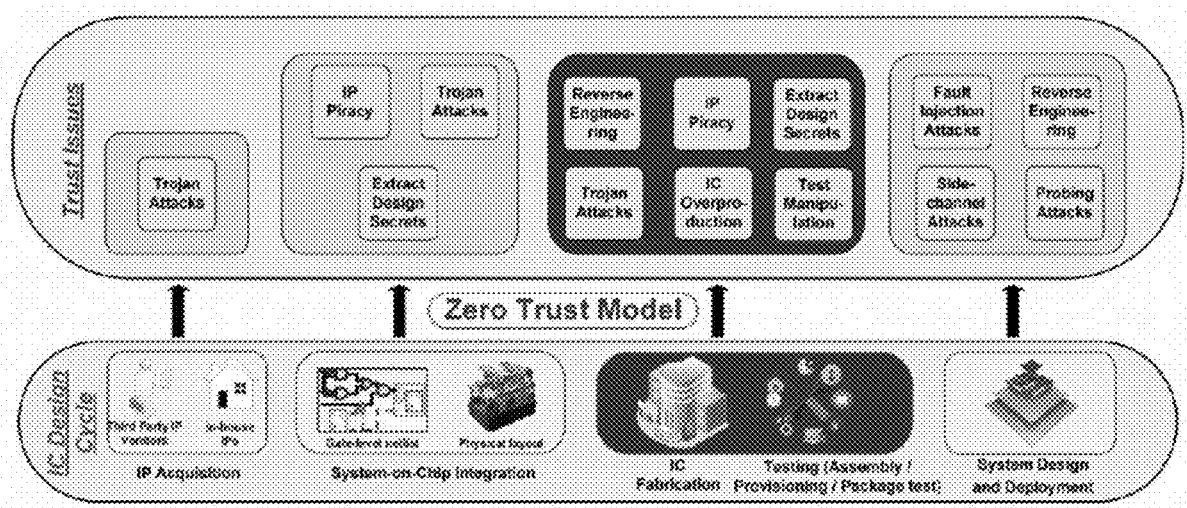
FIG. 1 shows a conventional design flow of an ASIC component or SoC.

The semiconductor industry is shifting to horizontal business models with vendors around the world to cope with the increasing cost and complexity of IC design and fabrication. A typical design flow of an ASIC component or SoC platform is illustrated in FIG. 1. As shown, the design process starts with the behavioral specification of design components, generally through a hardware design language (HDL) such as VHDL or Verilog. The register-transfer level (RTL) description is mapped to specific design libraries and desired node technologies to generate the gate-level netlist of the design. The design netlist is then translated into design layouts from which the GDSII files are created. The foundries are provided with the GDSII files to fabricate the silicon chips, and test and provision these physical chips at the testing facilities. Chips passing the tests are assembled for packaging, and then re-tested and made available to the market for deployment in the target systems.

Figure 2:
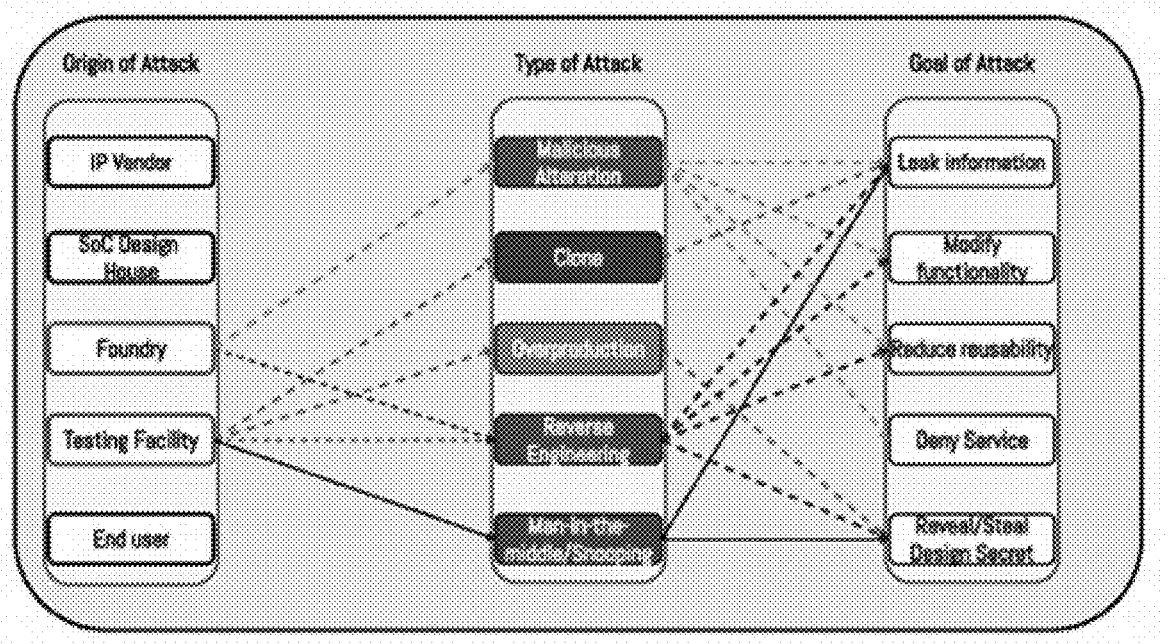
FIG. 2 shows a number of attack types that may occur in a testing facility.

FIG. 2 shows various types of attacks based on the attacker's origin, and goal of the attack. The ICs are susceptible to malicious alteration, commonly referred to as hardware Trojan insertions at the untrusted foundry. Such illegal and unauthorized modifications are made to reveal design secrets, modify original design functionality, or make the chip functionality inoperative during operation leading to denial-of-service (DoS) scenarios. The attackers at the foundry and testing sites can fabricate fake, clone chips and overproduce ICs by reporting low yield or fabricating the test results. Later, the cloned, fake ICs can be exploited to reveal design secrets, steal the design, reveal trade secrets, etc. Similarly, the attackers can reverse engineer the ICs to reveal the design secrets and extract confidential design artifacts and collaterals. The malicious entities at the testing facility can collude with attackers at the foundry and launch man-in-the-middle attacks to snoop the design secrets during the testing and asset provisioning.

Figure 3A:
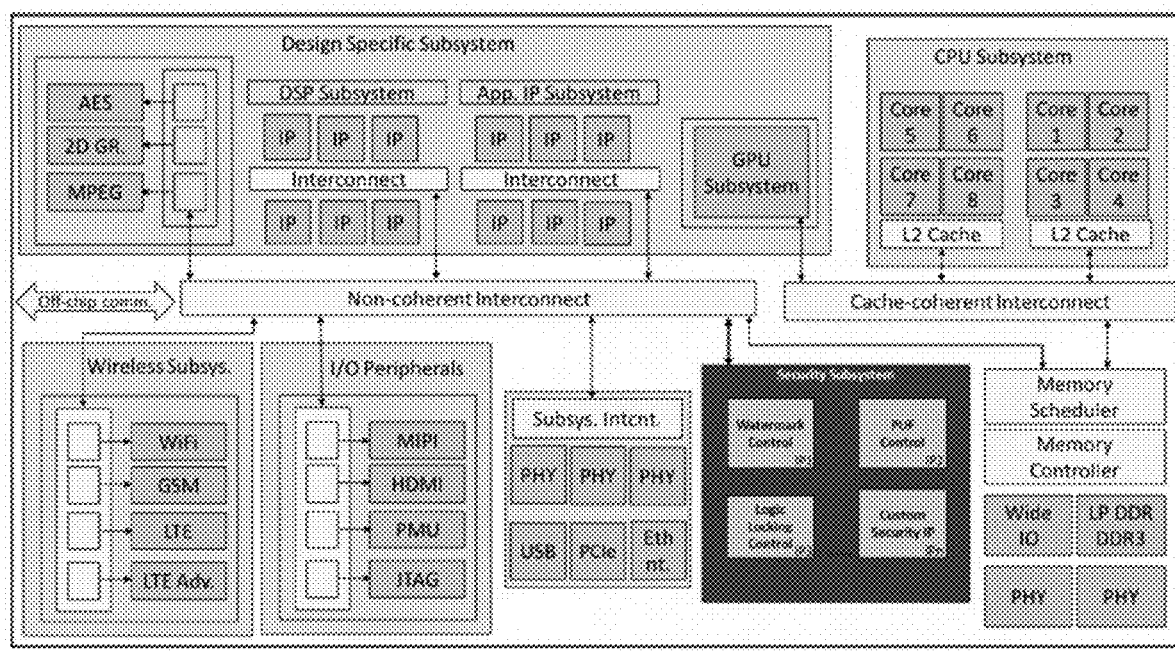
FIG. 3A is a block diagram of an exemplary SoC.
Figure 3B:
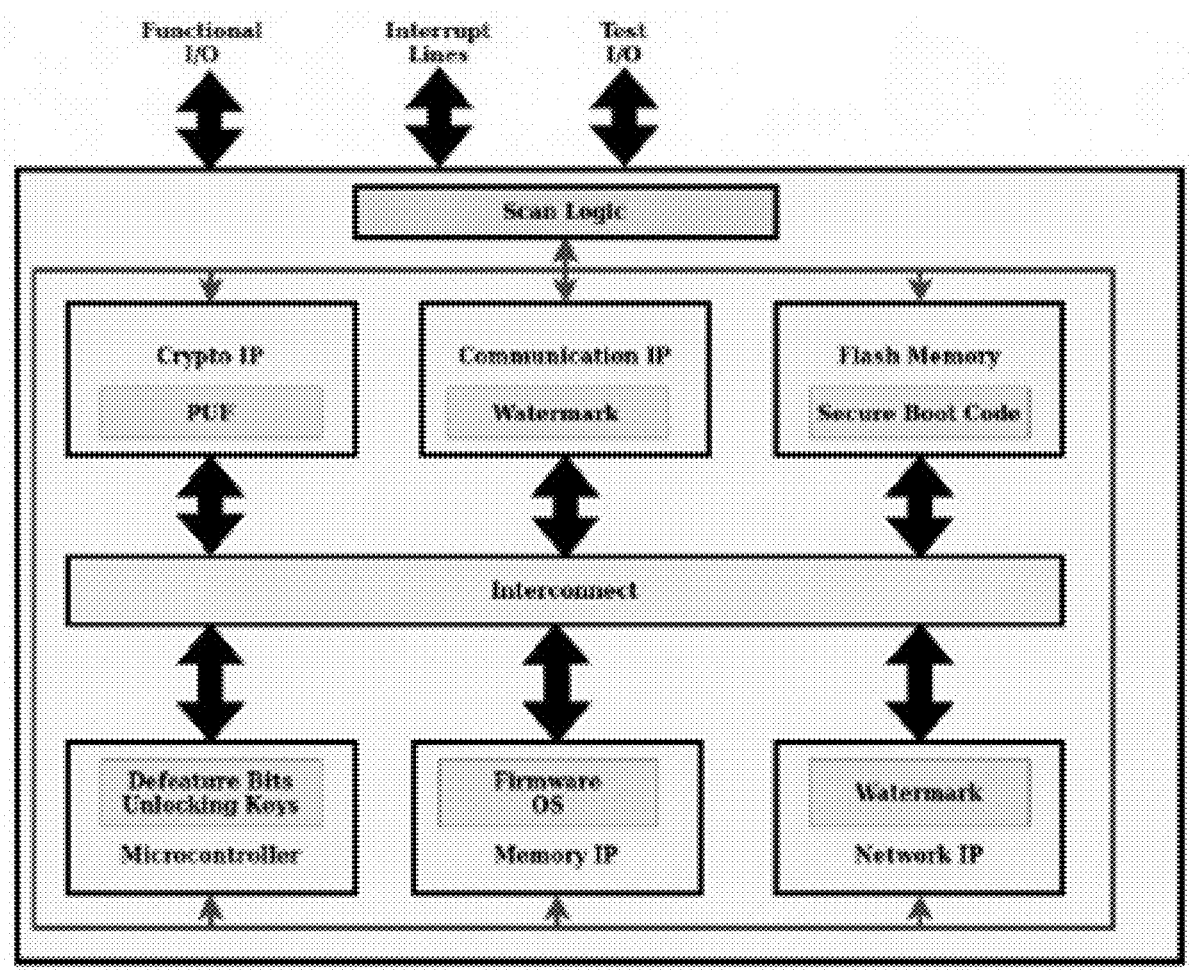
FIG. 3B is a block diagram of another exemplary SoC.

Given the prevalence of ICs in mission-critical applications, it is crucial to enable streamlined inclusion of security architectures and features from the early stages of chip design flow. The current technique used in ensuring trustworthy operation of chips across different phases of the device life cycle includes integration of infrastructure IPs for security based on application domains and use case requirements of target systems. ICs with standardized infrastructure IPs facilitate designers with varying expertise to exercise the security features and ensure system trustworthiness without a comprehensive understanding of underlying architectures. FIG. 3A shows an example of a representative, standardized SoC platform augmented with a dedicated, centralized security subsystem. A description of the chip's security components and associated testing and provisioning framework is provided below. FIG. 3B shows another example of a representative, standardized SoC platform augmented with security assets. The SoC shown in FIG. 3 comprises a Physically Unclonable Function (PUF) for performing authentication, a locked IP for obfuscating the functionality, and a watermark for verifying provenance.

Security Architectures

The security requirements of modern ICs are mostly implemented via distributed security architectures and specifications distributed across the chip. The dispersed security requirements are enforced with the help of security IPs with specific functionalities. For example, various authentication mechanisms are deployed in distributed and centralized manner to authenticate target IPs. Similarly, security architectures and specifications are implemented to successfully unlock obfuscated or locked IPs. A description of the functionality of security IPs shown in FIGS. 3A and 3B are described below.

Logic Locking: The logic locking IP is typically employed to unlock target IPs that are locked via state space obfuscation or key gate insertion. It unlocks IPs by applying keys that are typically provisioned from off-chip asset management infrastructures or stored in an on-chip non-volatile memory (NVM). Common use cases of the logic locking IP include receiving keys from an Asset Management Infrastructure (AMI), generating/procuring IP-specific locking metadata such as type of logic locking, key size, I/O specification for key application, key application period in terms of clock cycle, and the like, as well as unlocking target IPs at system start-up and reset based on corresponding metadata.

PUF-based Authentication: The PUF IP aids the authentication of target IPs of the SoC. It authenticates target IPs through unique challenge-response pairs (CRPs). The golden CRPs are provisioned from the off-chip AMI or stored in an on-chip NVM. These CRPs are later used by the PUF IP to securely authenticate target IPs by comparing the extracted CRPs with the provisioned/golden CRPs. The use cases of the PUF control IP include receiving CRPs from AMI, initiating the authentication process by sending challenge vectors to target IPs, comparing obtained CRPs with golden values, updating the AMI repository after authentication successes and failures, and the like.

Watermarking: Watermarking enables a digital signature based authentication mechanism either through the insertion of additional logic gates or by producing specific design templates that can be controlled and observed. Watermarking helps to thwart attacks such as IP piracy, IC overproduction, and the like. The watermark IP manages a query-based validation of watermarking technology deployed at each target IP. Typical use cases of watermark control IP include extraction of watermarks from target IPs, comparison of retrieved watermarks with golden references, IP-status maintenance based on obtained responses, and updating AMI repository with watermark match/mismatch results, and the like.

Provisioning from AMI

IC assets such as crypto keys and security specifications are rarely stored in on-chip NVMs due to their increased exposure to a diverse set of attack surfaces at the untrusted environment. Hence, asset provisioning has become a crucial part of IC testing, especially for chips designed with standardized, state-of-the-art security mechanisms. Standalone security IPs incorporating logic locking, PUF-based authentication, and watermarking require keys to be provisioned from trusted repositories to verify the chip functionality when powered up for the first time. For example, the logic locking keys are required at system boot to unlock the locked IPs and verify the functional correctness of their operation. Similarly, the PUF IP require off-chip golden reference CRPs to successfully authenticate the target IP at secure boot. Watermarks are also needed to be procured for IP verification and authentication purposes. Automatic Testing Equipment (ATE) are designed with compatible functionalities to facilitate asset procurement to the design under test (DUT). A common practice in present day IC testing is to provision assets from off-chip cloud infrastructure. However, the security vulnerabilities of the provisioning process can compromise the IC under test.

Hardware Security Module as the Root of Trust

A trusted hardware security module (HSM) is introduced at the testing facility to enable secure communication between the cloud based AMI, and the ATE and the chip under test. The HSM acts as the root of trust throughout the process. However, the mere utilization of such hardware module at zero trust environment is not sufficient to establish trust and mitigate the attack surfaces of the testing site. An example of how the security provided by the HSM can be bypassed by malicious entities in testing facilities to steal assets with fake, cloned chips and infiltrate the original IC supply chain with overproduced and/or untested, out-of-spec chips is provided herein.

Threat Model

Attacks can be orchestrated at the fabrication and testing phase of the chip design flow. The minimally invasive nature of the attacks facilitates rogue entities to implement the attacks on cloned and authentic ICs with almost no or very limited knowledge of the design. Thus, the attacker can bypass the traditional locking mechanisms to make these malicious alterations.

A first attack type described herein requires cloned IC with internal observable nodes. The attacker at the untrusted foundry modifies the GDSII file of the design to implement the attack. The threat model described herein only allows the attacker to alter the existing design to add observable nodes. Such minimal invasion to design files helps the attacker keep the area or power overhead small and leave the original design components as it is. The attacker can also retrieve the wires and flip-flops required for internal observability from the available fabrication specification. Hence, the amount of reverse engineering included in this task is also trivial.

A second attack type entails the use of an IC with duplicate, stolen IP watermarks. The attacker exploits a cloned SoC with internal observability to steal original IP watermarks at the testing site. Similarly, this strategy of extracting IP watermarks via internal nodes requires minimal changes in the original GDSII file and does not incur any noteworthy area or power overhead. The stolen watermarks are used during asset provisioning to implement the attack.

A third attack type requires a tampered automatic test equipment (ATE) that falsely reports the chip test results. The malicious attacker at the rogue testing facility tampers the test equipment to produce fabricated results. Since the manufacturers have no feasible way to track each failed chip without incurring prohibitive expenses, they are entirely dependent on the testing facility about the test and yield reports.

Figure 4:
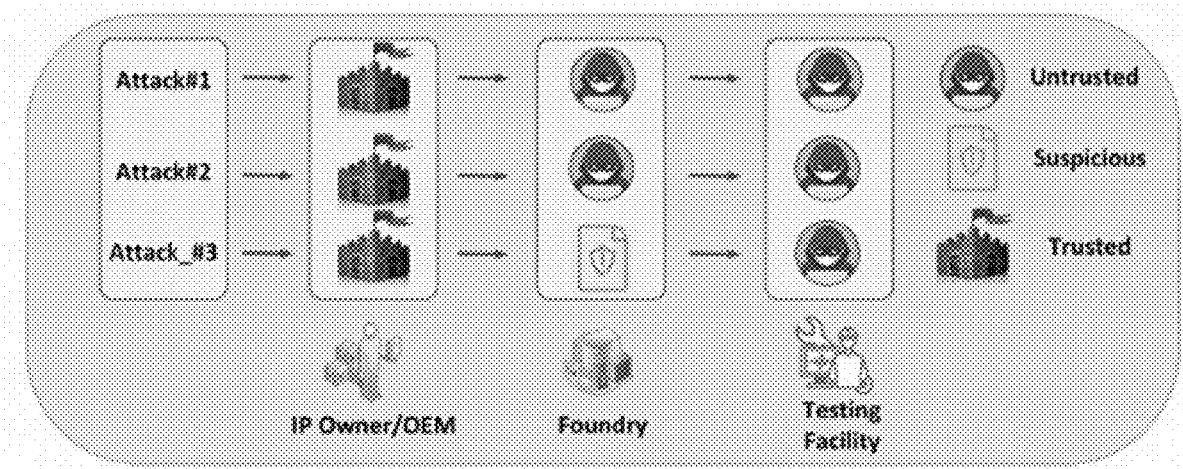
FIG. 4 shows the trust level on participating entities associated with a number of threat models.

FIG. 4 shows the trust level on each participating entity in the threat models as described herein, and which is made based on the following assumption:

The foundry and testing facility are fully untrusted.
There is collusion between the adversaries located at the foundry and the testing facility.
The adversary can fabricate cloned ICs with internal observable nodes.
The adversary can tamper the test equipment.

Attack Scenarios

Below is an outline of an attack scenarios related to an SoC tested in an untrusted testing facility.

A. Attack #1: Asset Extraction Via Clone SoC

Attack Synopsis

Figure 5:
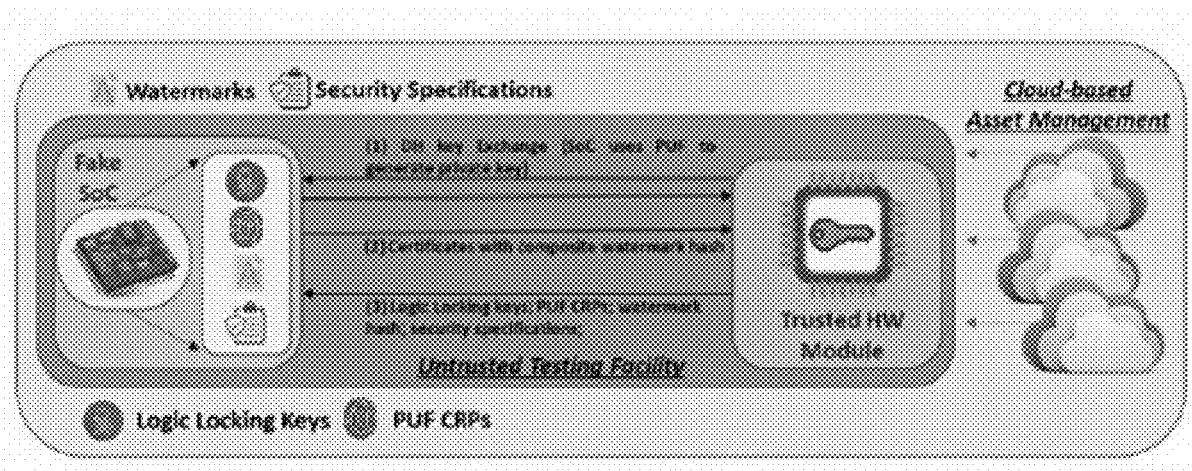
FIG. 5 shows an attack type by which information about an IC may be extracted by observing internal nodes of a cloned IC.

Adversary: Malicious entities at untrusted testing facility and colluding foundry.
Goals of Attack: (1) obtaining chip assets (i.e., PUF CRPs, logic locking keys, and watermarks); (2) IC cloning; (3) IP piracy; (4) infiltrating original IC supply chain by inserting fake chips.
Assumption: (1) potential collusion between untrusted foundry and rogue testing facility Flow of Attack FIG. 5 illustrates the manner by which the attackers can exploit a clone IC with internal observability to legally provision assets from the AMI cloud and extract assets to gain unbridled access to design secrets. It is seen that the clone IC with valid security IPs can retrieve valid watermarks from identical IPs to authenticate itself to the trusted HSM since watermarks are cloneable secrets contrary to PUF CRPs which are unclonable and unique for each chip. The attack flow is as following:

To begin the testing process, a secure connection is established between the HSM and the IC under test. It is assumed that the secure connection conforms to the Diffie-Hellmann (DH) key exchange protocol. The SoC employs the integrated PUF IP to generate the private key. The HSM uses provisioned keys as its private key.

Once a secure communication is established via the DH protocol, the valid security IP in the clone IC sends encrypted composite watermark hash to the HSM. It compares watermark hash with the watermarks provisioned from AMI cloud. Upon successful validation, HSM enables the provisioning of all design secrets to the clone IC including PUF CRPs, logic locking keys, security specifications, and the like.

The secrets get stored inside an NVM of the clone SoC which can be accessed by the attacker with the help of internal nodes. Once the attack is successful, the assets can be employed in a real SoC that is not provisioned. Also, the clone SoC with attacker's access to it can be deployed with authentic designs for exploitation at a later phase of IC life cycle.

B. Attack #2: Asset Extraction Via Man-In-the-Middle Attack

Attack Synopsis

Adversary: Malicious entities at untrusted testing facility and colluding foundry.
Goals of Attack: (1) obtaining IC assets (e.g., PUF CRPs, logic locking keys, watermarks, and the like); (2) IC cloning; (3) IP piracy; and (4) infiltrating original IC supply chain by inserting fake chips.
Assumptions: (1) potential collusion between untrusted foundry and rogue testing facility; (2) compromised communication channel between the trusted hardware module and security IPs of SoC under test.

Flow of Attack

Figure 6:
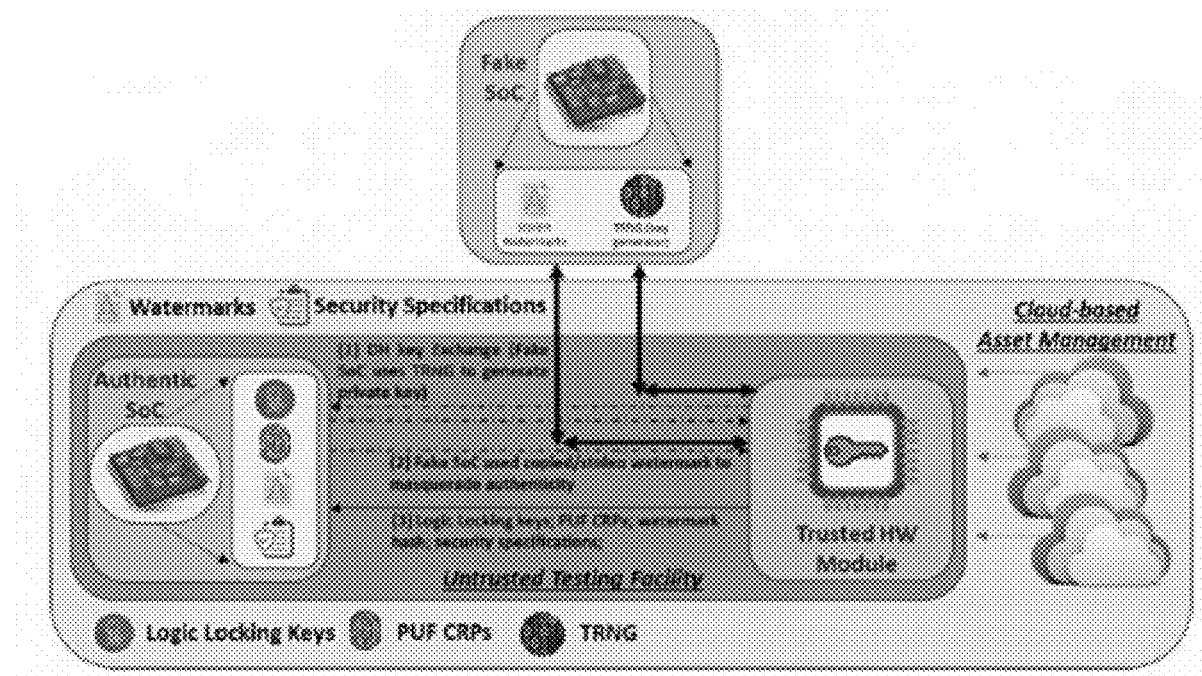
FIG. 6 shows an attack type by which an attacker can exploit a clone IC to extract provisioned assets and design secrets.

FIG. 6 depicts the manner by which attackers can exploit a clone IC with copied watermarks to interrupt the communication between the trusted HSM and DUT and extract the assets procured from the AMI. It is seen that the clone IC can use several means, such as a TRNG, to generate the private and public keys for the DH key exchange protocol and masquerade as an authentic entity during provisioning via HSM if the communication is not completely secure. The flow of the attack is outlined below.

The clone IC generates the private key from the TRNG and then generates the public key from the private key. Similarly, HSM generates its own pair of private and public keys. The public keys are shared according to the DH key exchange protocol.

Once a secure session is established by the clone, masquerading IC, it sends the copied watermarks to the HSM for validation. HSM verifies the watermark composite hash with the procured watermarks from AMI.

Upon validation of the watermark hash, HSM sends the assets to the clone chip. The viability of the attack shows that watermark hash based authentication is susceptible to various attack surfaces of the untrusted testing site. The presence of the HSM as the root of trust fails to prevent the malicious entities from stealing design secrets.

C. Attack #3: Overproduction Via Fabricated Test Results

Attack Synopsis

Adversary: Malicious entities at untrusted testing facility

Goals of the Attack: (1) exploit successfully provisioned chips to extract design secrets; (2) overproduce SoCs for illegal purposes.

Assumptions: (1) the Automatic Test Equipment (ATE) is untrusted; (2) The failed chips are not sent back to the manufacturer or not checked for their authenticity in manufacturer's trusted facility. Note that checking the PUF signatures for multiple CRPs and matching those with the database can be prohibitively expensive for the manufacturer.

Flow of Attack

Figure 7:
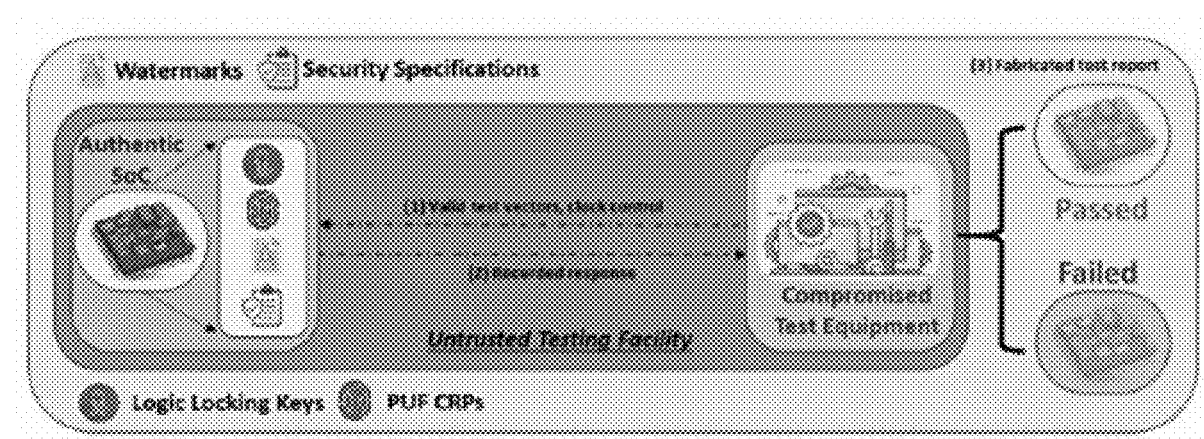
FIG. 7 shows an attack type used to fabricate test results of an IC.

An attack scenario according to which the rogue testing facility maliciously fabricates the test results to steal design secrets and overproduce ICs illegally is described. FIG. 7 illustrates the attack scenario of fabricating the test results of provisioned SoCs. The operational flow is described below.

At testing phase, the attacker uses an authentic IC to establish connection with the cloud based AMI and provision the assets and design secrets for functional verification of the chip. Once the keys are provisioned, the attacker manipulates the ATE to produce wrongful result i.e., report failure of provisioning and testing of ICs even though the chips passed the tests. The attacker obtains the ICs with fabricated test results from the ATE and exploits the chips to steal the design secrets. The attacker can also insert the wrongfully tested chips in the original supply chain as overproduced ICs. The failed chips are rarely sent back to the manufacturer for verification since the expense of verifying the failed chips with unique IDs such as PUF CRPs is prohibitive.

Analysis of the attack surfaces of an untrusted testing facility shows that the weak communication channels of provisioning along with attacker's unbridled access to provisioned chips leads to a manifold increment of attack surfaces. Embodiments of the present invention when deployed at an untrusted testing site establish a conducive environment for trustworthy operations in a potentially hostile location. Embodiments of the present invention, together with the other security measures such as authentication and locking mechanisms, provide a secure and trustworthy environment for IC asset provisioning and testing in a zero trust model, as described further below.

TITAN Architecture

Some embodiments of the present invention have the following operational capabilities.

Accessibility: These embodiments do not restrict access between the asset and any entity in the supply-chain, which would hamper design productivity. For example, an untrusted foundry is still able to verify the working of the design in order to quantify yield and other metrics.

Verifiability: These embodiments enable the owner to verify the interaction between the untrusted entity and the asset. This means that these embodiments provide a means of logging or analyzing any interaction with the asset.

Adaptability: Different entities in the supply-chain have different degrees of communication with the asset. These embodiments provide the vendor a framework to deploy adaptive security policies instead of one-static security solution.

These embodiments enable the owner a way to completely restrict the untrusted entity from interacting with the asset in case of a potential infarction.

These embodiments allow for supporting a wide variety of security policies that account for both known and unknown threat vectors.

Figure 8A:
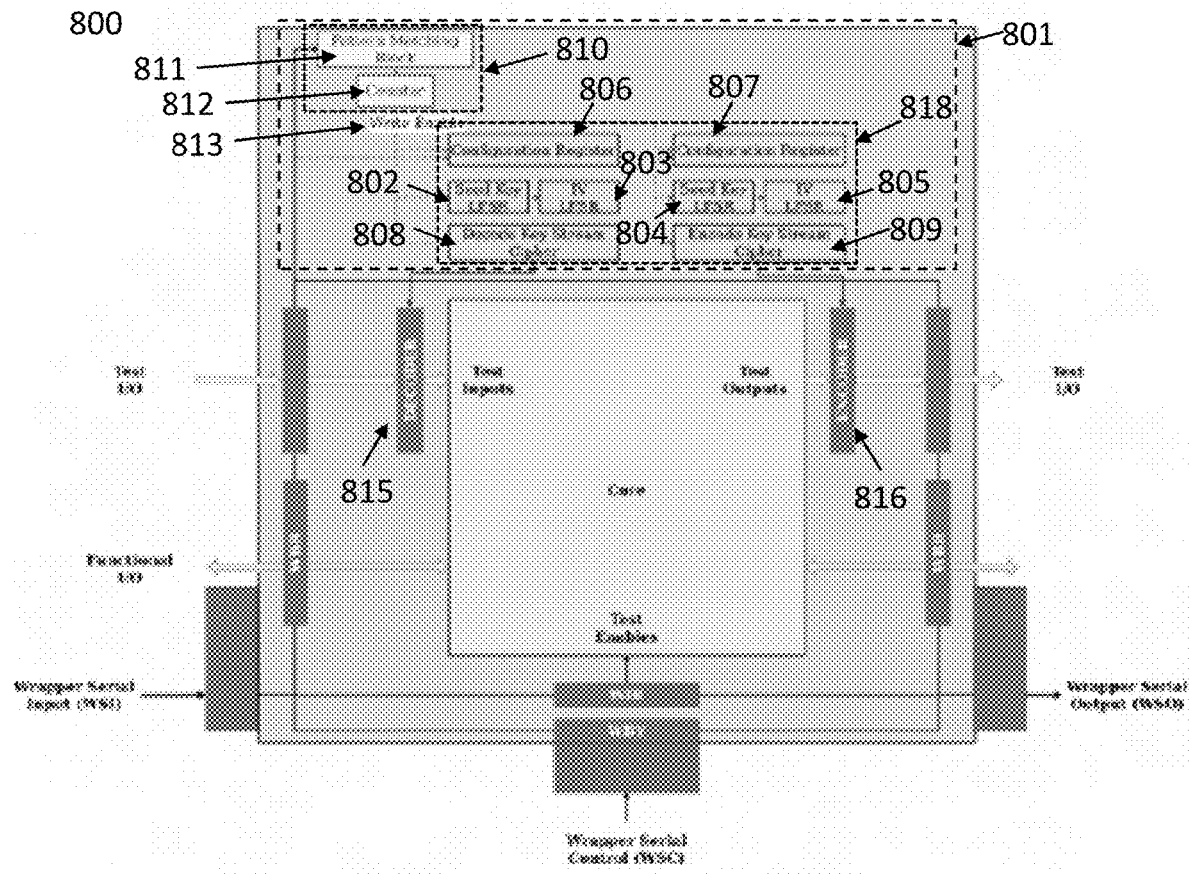
FIG. 8A shows a block diagram of an exemplary SLEEVE module disposed in a Design Under Test (DUT), in accordance with one embodiment of the present invention.
Figure 8B:
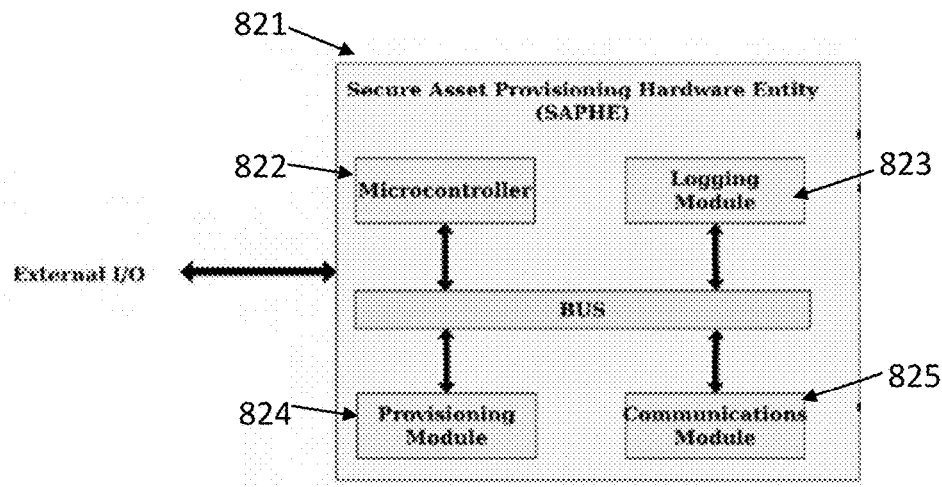
FIG. 8B shows a block diagram of an exemplary SAPHE module, in accordance with one embodiment of the present invention.

According to some embodiments of the present invention, a system 800 (alternatively referred to herein as TITAN), shown in FIGS. 8A and 8B, can be deployed at an untrusted testing site, along with the other security measures such as authentication and locking mechanisms, to guarantee a secure and trustworthy environment for IC asset provisioning and testing in a zero trust environment. In some embodiments, the system 800 comprises a security wrapper that augments a DUT. The security wrapper can be a modified IEEE 1500 test wrapper. The security wrapper facilitates a Secure Asset Provisioning Hardware Entity (SAPHE) module, which will be discussed in more detail below, to perform the provisioning operations without significantly impacting the overall performance of the DUT. The security wrapper enables the SAPHE to seamlessly interact with the security asset on the DUT in an agnostic fashion. In some embodiments, the IEEE 1500 wrapper is modified by adding an extra input port called the TITAN_MODE. The TITAN_MODE along with the WRSTN signal, a dedicated asynchronous Wrapper Reset signal in the IEEE 1500 wrapper, is used to enable different modes as follows, and the various security operations such as provisioning, unlocking, and authentication are performed in TITAN Mode.

TITAN_MODE=0, WRSTN=0: Functional Mode.
TITAN_MODE=0, WRSTN=1: Test Mode.
TITAN_MODE=1, WRSTN=1: At Speed Test Mode.
TITAN_MODE=1, WRSTN=0: TITAN Mode.

In some embodiments, the system 800 comprises a provisioning unit (alternatively referred to herein as a secure reconfigurable key provisioning architecture (SLEEVE) module). FIG. 8A shows a block diagram of an exemplary SLEEVE module 801 disposed in a Design Under Test (DUT), in accordance with one embodiment of the present invention. The provisioning unit (or the SLEEVE module) 801 comprises an encoding/decoding module 818. The encoding/decoding module 818 comprises a decode key stream cipher module 808 and an encode key stream cipher module 809 that produce the key bits used by a decoder module 815 and an encoder module 816 for decoding/encoding the inputs/outputs of the circuit. In some embodiments, the encoding/decoding module 818 further comprises Seed Key programmable linear-feedback shift registers (LFSRs) 802, 804, and Initialization Vector (IV) LFSRs (alternatively referred to herein as IV Key LFSRs) 803, 805, which are needed by the stream cipher modules to produce the decoding/encoding Keys. In some embodiments, the encoding/decoding module 818 comprises configuration registers 806 and 807 to initialize the LFSRs. In some embodiments, the provisioning unit 801 further comprises an unlocking module 810. In some embodiments, the unlocking module 810 is a finite state machine (FSM) obfuscation module that prevents unwarranted writes. The unlocking module 810 comprises a pattern matching block 811 and a mod-M counter 812. The pattern matching module 811 takes in a key sequence as an input. If the correct key bits are applied, the counter's value is incremented. Upon applying the right set of key sequence, the write enable signal 813 is triggered, and the value of the configuration registers can be updated. The configuration registers allow the design house to select different LFSR configurations and startup values. The provisioning unit's architecture allows the design house to safeguard against threats from an untrusted foundry and testing facility.

In some embodiments, the system 800 comprises a Secure Asset Provisioning Hardware Entity (SAPHE) module. FIG. 8B shows a block diagram of an exemplary SAPHE module 821, in accordance with one embodiment of the present invention. The SAPHE module 821 is a trusted HSM. In some embodiments, the SAPHE module 821 comprises a microcontroller 822, a logging module 823, a provisioning module 824, and a communications module 825.

The microcontroller 822 is responsible for carrying out the various operations of the provisioning entity. The microcontroller allows the design house to implement flexible security policies and support different security assets. The microcontroller interacts with the SLEEVE module 801 in the DUT to unlock and configure the decoder and encoder LFSRs. The microcontroller also interacts with the tested design to obtain the device status and other associated information necessary to conduct an audit of the testing process.

The logging module 823 comprises dedicated memory segments storing the configuration values for the provisioning unit of the DUT, and the unlocking pattern for enabling write access to the configuration registers. The logging module also stores the information obtained from the Design under Test, such as the device status.

The provisioning module 824 comprises a Content Accessible Memory (CAM) module that stores the encrypted test patterns and the encoded asset provisioning vectors for each security asset present in the DUT. The provisioning module also stores the encoded responses obtained from the DUT and performs validation operations such as watermark attestation and device registration using PUF responses.

The communication module 825 allows the SAPHE module to establish a secure channel with the design house. This allows the design house to update security policies, change the configuration, and access audit information obtained from the DUT after the testing process.

In some embodiments, the SAPHE module 821 is a separate entity. In some other embodiments, the SAPHE module 821 or the key components of the SAPHE module 821 can be integrated with the Automated Test Equipment (ATE).

TITAN Provisioning Protocol

Figure 9:
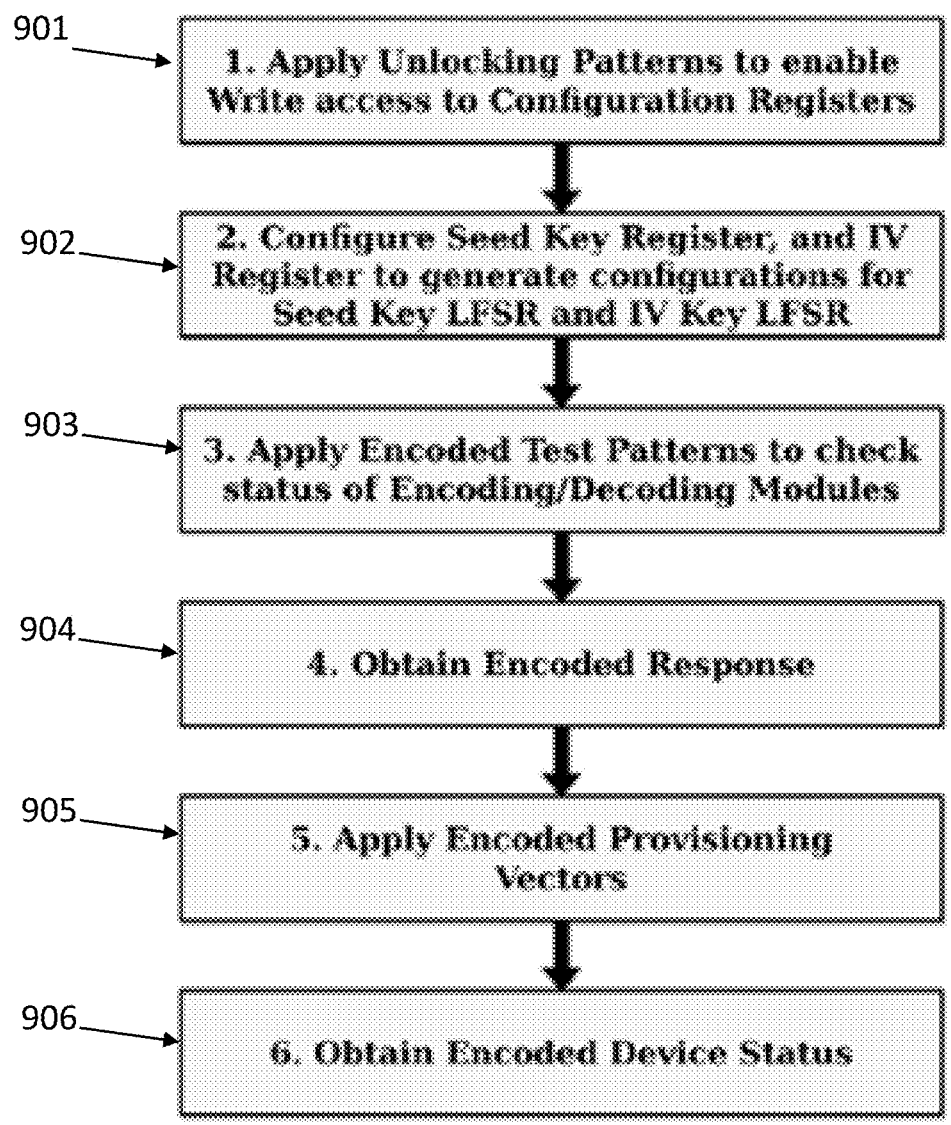
FIG. 9 illustrates an exemplary provisioning process, in accordance with one embodiment of the present invention.

According to some embodiments of the present invention, the assets on the DUT are provisioned through a provisioning method (alternatively referred to herein as a provisioning protocol or a provisioning process) comprising a series of interactions between the DUT and the SAPHE module. An exemplary provisioning method is illustrated in FIG. 9. The provisioning method comprises step 901 wherein the SAPHE module 821 is configured to fetch the unlocking key patterns from the Logging Module 823 and apply them to enable write access to the configuration registers 806 and 807 in the SLEEVE module 801 of the DUT.

In some embodiments, the provisioning method further comprises step 902 wherein, upon detecting the correct set of unlocking keys are applied, the Seed Key LFSRs 802 and 804, and the IV Key LFSRs 803 and 805 are configured by the Configuration Registers 806 and 807. The Configuration Registers enable the Design House to determine the configuration and the initial value for the Seed Key and IV Key LFSRs in the encoding/decoding module 818. In some embodiments, once the Configuration Registers are loaded, the Seed Key and IV Key LFSRs are configured to generate the values for the stream cipher modules 808 and 809 to generate key bits for decoding and encoding the inputs and outputs of the circuit, respectively. The generated key bits are then used by the decoder module 815 and the encoder module 816 to decode and encode the inputs and outputs of the DUT, respectively. The Seed Key and IV Key LFSRs are configured to periodically refresh the seed and IV values used by the stream cipher modules 808 and 809 to generate the key bits for the encoder and decoder modules 815 and 816 to prevent any correlation-based attacks from being carried out.

In some embodiments, the provisioning method further comprises steps 903 and 904. In step 903, the SAPHE module 821 is configured to apply a set of encrypted test patterns to the SLEEVE module 801. In some embodiments, the SAPHE module 821 is configured to fetch the set of encrypted test patterns from the provisioning module 824 before applying it to the SLEEVE module. In step 904, the SAPHE module 821 is configured to receive encoded responses to the test patters from the SLEEVE module 801 and determine whether the SLEEVE module is properly configured based at least in part on the received responses to the test patterns. Based on the responses of the SLEEVE module, the provisioning process may be further carried out.

In some embodiments, the provisioning method further comprises step 905 wherein, upon determining the SLEEVE module is properly configured, the SAPHE 821 is configured to fetch the encoded provisioning vectors from the provisioning module 824 and then applies them to the SLEEVE module 801.

In some embodiments, the provisioning method further comprises step 906 wherein the SAPHE module 821 is configured to receive encoded responses to the provisioning vectors from the SLEEVE module 801 and to determine the success of the provisioning process based at least in part on the received responses. In some embodiments, upon determining the success of the provisioning process, the SAPHE module 821 is configured to fetch encoded unlocking keys from the provisioning module and apply them to the DUT for unlocking the functionality of the DUT. This enables an ATE module to perform a testing process on the DUT. Upon completion of the testing process, the SAPHE module is configured to obtain the device status information about the DUT.

Figure 10:
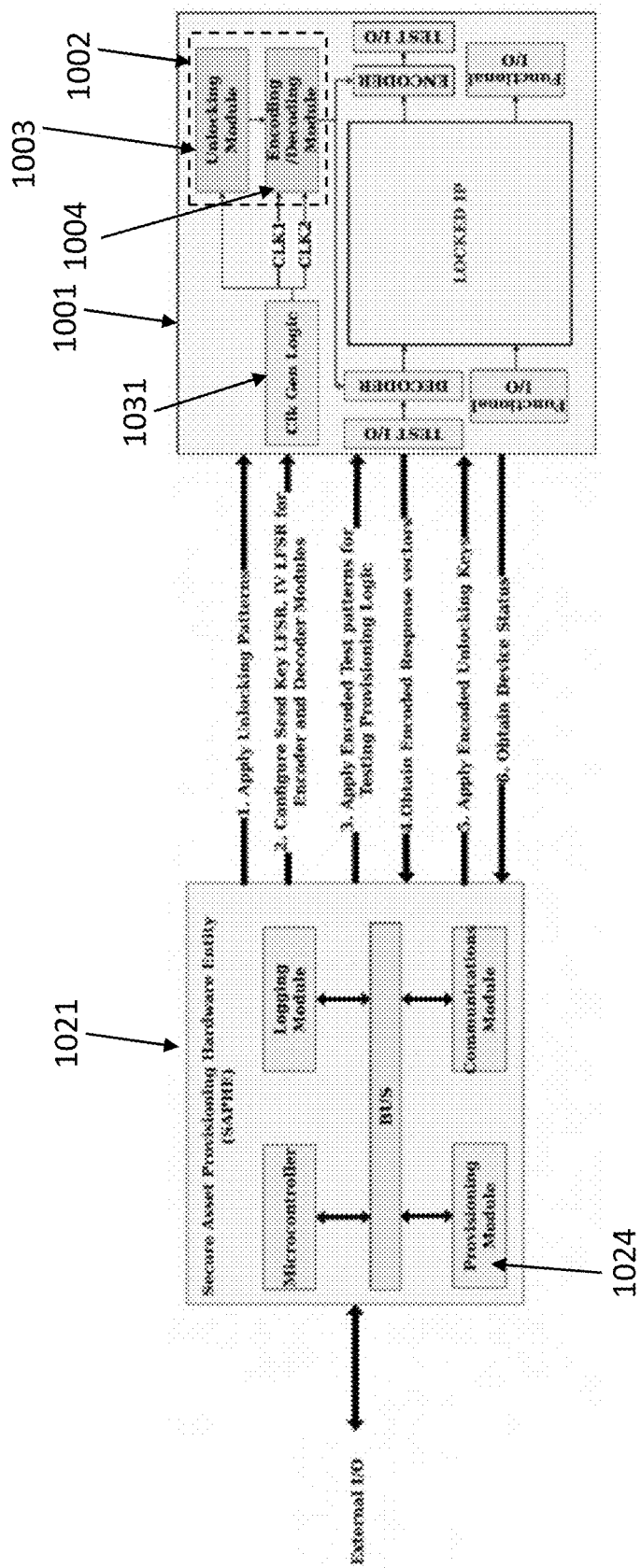
FIG. 10 illustrates an exemplary provisioning process for a DUT comprising a logic locked IP, in accordance with one embodiment of the present invention.

FIG. 10 illustrates an exemplary provisioning process for a DUT comprising a logic locked IP, in accordance with one embodiment of the present invention. In the case of logic locking, the security assets are the unlocking keys used to enable the functionality of the original IP. To securely provisioning the locked IP, as shown in FIG. 10, a SAPHE module 1021 is configured to enable the provisioning mode by setting the TITAN_MODE to 1, and the WRSTN pin to 0. The test wrapper of the DUT 1001 is now set to TITAN mode. Then, the SAPHE module 1021 is configured to apply the unlocking patterns to enable write access to the configuration registers in the SLEEVE module 1002 of the DUT 1001. The SLEEVE module comprises an unlocking module 1003 and an encoding/decoding module 1004. In some embodiments, although not shown in FIG. 10, the unlocking module 1003 comprises the same elements as that of the unlocking module 810 in FIG. 8A, and the encoding/decoding module 1004 comprises configuration registers, Seed Key and IV Key LFSRs, and encode/decode key stream cipher modules, similar to that in the SLEEVE module 801. Once the write enable signal is asserted, the SAPHE module is configured to configure the Seed Key LFSRs and the IV Key LFSRs using the configuration registers. The clock period of the LFSRs are set using a Clock Generator Module 1031 to CLK1. This is done to ensure that the Seed Key and IV LFSRs periodically refresh the Seed and IV values of the stream ciphers. The SAPHE module 1021 is further configured to verify that the stream ciphers are properly configured by applying a set of encoded test patterns and observing their responses. Once the responses are deemed to be valid, the SAPHE module 1021 is configured to fetch the encoded unlocking keys from a provisioning module 1024 and apply them to the DUT 1001. The encoded unlocking keys are decoded by the decoding stream cipher module and then applied to the DUT for unlocking the functionality of the design. This enables the ATE module to perform the necessary test operations without gaining access to the critical security assets of the DUT. Upon completion of the testing process, the SAPHE module is configured to obtain the device status information about the DUT.

Figure 11:
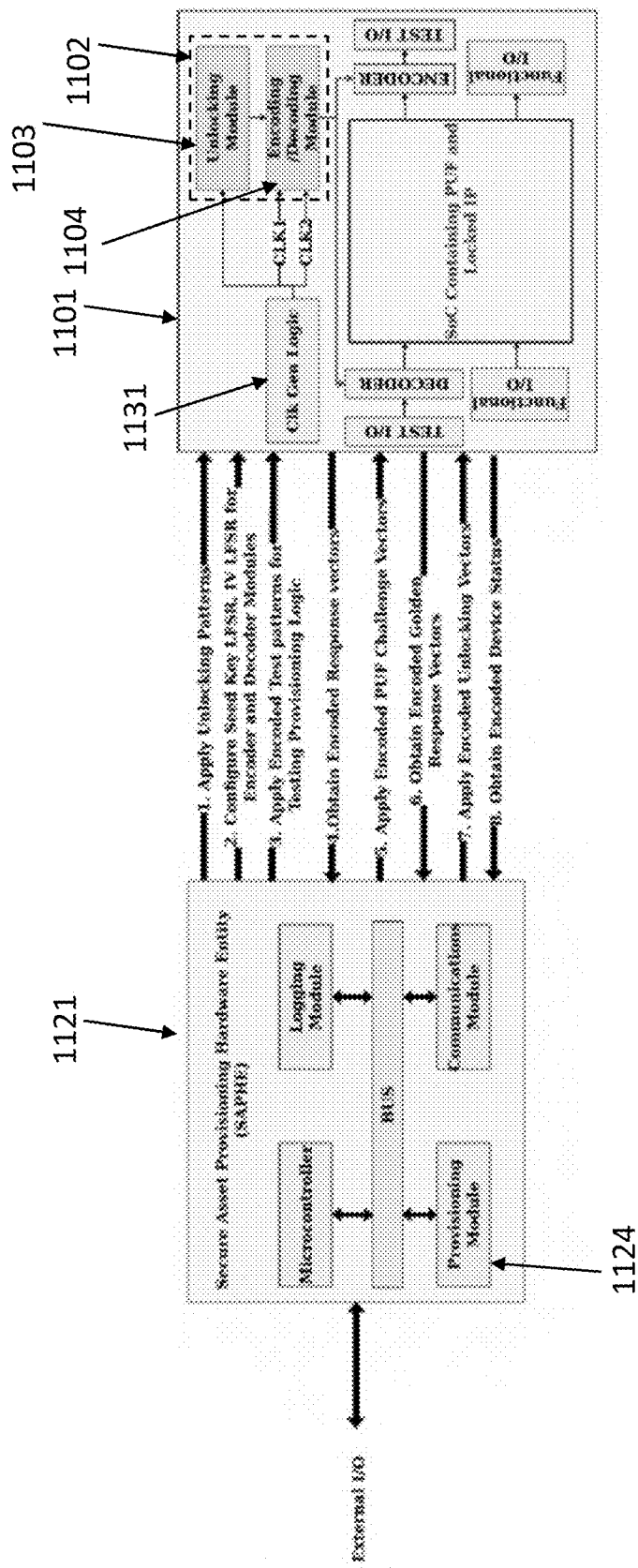
FIG. 11 illustrates an exemplary provisioning process for a DUT comprising an IP block with a PUF and another IP block that is locked, in accordance with one embodiment of the present invention.

FIG. 11 illustrates an exemplary provisioning process for a DUT comprising an IP block with a PUF and another IP block that is locked, in accordance with one embodiment of the present invention. To securely provisioning the PUF and the locked IP blocks in the DUT 1101, as shown in FIG. 11, a SAPHE module 1121 is configured to enable the provisioning mode by setting the TITAN_MODE to 1, and the WRSTN pin to 0. The test wrapper of the DUT 1101 is now set to TITAN mode. Then, the SAPHE module 1121 is configured to apply the unlocking patterns to enable write access to the configuration registers in the SLEEVE module 1102 of the DUT 1101. The SLEEVE module 1102 comprises an unlocking module 1103 and an encoding/decoding module 1104. In some embodiments, although not shown in FIG. 11, the unlocking module 1103 comprises the same elements as that of the unlocking module 810 in FIG. 8A, and the encoding/decoding module 1104 comprises configuration registers, Seed Key and IV Key LFSRs, and encode/decode key stream cipher modules, similar to that in the SLEEVE module 801. Once the write enable signal is asserted, the SAPHE module 1121 is configured to configure the Seed Key LFSRs and the IV Key LFSRs in the SLEEVE module of the DUT 1101 using the configuration registers. The clock period of the LFSRs are set using a Clock Generator Module 1131 to CLK1. This is done to ensure that the Seed Key and IV LFSRs periodically refresh the Seed and IV values of the stream ciphers. The SAPHE module 1121 is further configured to verify that the stream ciphers are properly configured by applying a set of encoded test patterns and observing their response. Once the response is deemed to be valid, the SAPHE module 1121 is configured to fetch encoded PUF challenge vectors from a provisioning module 1124 and apply them to the DUT 1101. The encoded PUF challenge vectors are decoded by the decoding stream cipher module and then applied to the DUT for obtaining response vectors of the DUT to the encoded PUF challenge vectors. The SAPHE module 1121 is further configured to verify the PUF IP by comparing response vectors of the DUT to the encoded PUF challenge vectors with golden response vectors. Once the PUF IP is verified, the SAPHE module 1121 is configured to fetch the encoded unlocking vectors from the provisioning module 1124 and apply them to the DUT 1101. The encoded unlocking vectors are decoded by the decoding stream cipher module and then applied to the DUT for unlocking the functionality of the design. This enables the ATE module to perform the necessary test operations without gaining access to the critical security assets of the DUT. Upon completion of the testing process, the SAPHE module is configured to obtain the device status information about the DUT.

The lack of SoC manufacturer's control over the fabricated chips is a critical security issues and leads to series of attack scenarios that violate the integrity of the IC supply-chain. The IC monitoring technique incorporated in TITAN helps the manufacturer to gain improved control over the ICs in post-fabrication testing and provisioning phase, and track the SoC accurately. TITAN facilitates IC monitoring by enabling the HSM to securely implement provisioning policies for the wide variety of security assets present on the SoC.

TITAN Evaluation

Benchmark Configuration: The TITAN framework is evaluated for provisioning a locked AES design, a watermarked AES design, and an SoC system containing a PUF-based IP and a locked IP. The AES implementation from the IWLS 2005 benchmark suite is chosen. An sequential locking mechanism is used for the locked AES implementation, and a watermarking scheme is used for the watermarked AES design.

Synthesis settings: The designs were synthesized using Synopsys Design Compiler Version R-2020.09-SP5 for Linux64. The design is optimized for optimal area and delay by using the set max delay and set max area constraints using the LEDA 250 nm library. The various IPs were synthesized separately to obtain the baseline area, gate-count, and power values. The IPs is then augmented with the locking and authentication mechanisms and synthesized to estimate the overhead results.

System Setup: The synthesis and simulation runs were performed on an 8-core Intel Core i7 CPU running at 3 GHz running linux kernel version 5.4.0-81-generic. The locked test pattern generator was written in C and was compiled using gcc version 7.5.0.

Results: The impact of the TITAN provisioning architecture and its overall security are quantified.

TITAN Overheads: TITAN provisioning logic comprises the programmable stream cipher, the programmable seed key LFSR, and the seed key register. The output of the stream cipher is connected to the XOR gate logic, which helps decode/encode the input/outputs. The impact of TITAN logic on the overall area, gate-count, and power are summarized in Table I. It is observed that TITAN incurs an average overhead of 3% in area, an average overhead of 1.78% in gate-count, and an average of 11.76% overhead in terms of power. However, the additional power overhead is only incurred during the testing phase as the TITAN encoding logic is disabled during the functional mode. It is also observed that the overheads decrease significantly as the size of the design increases thus, making TITAN suited for provisioning SoC-scale applications. The impact of adding the extra XOR circuitry at the inputs and outputs is shown in Table II. It is observed that the XOR circuitry incurs an average delay overhead of 3.97%.

The impact of varying the stream cipher algorithms is shown in Table III. The stream cipher implementations, HC, Trivium, and Grain, are chosen from the eSTREAM cipher candidate list. The modified Grain-128AED variant is chosen as it is more secure than the naive Grain implementation. It is observed that the HC cipher option was the most efficient for area and gate count, with the stream cipher contributing less than 1% overhead.

TABLE I

The area, gate count and power overheads for three designs containing different security assets.

| | Baseline Design | | | With Titan | | | Percentage Overheads (%) | | |
|---|---|---|---|---|---|---|---|---|---|
| Design | Area (sq · um) | Gate count | Power (mW) | Area (sq · um) | Gate count | Power (mW) | Area | Gate Count | Power |
| Locked AES | 23216772.18 | 527510 | 1038.9 | 23975029.94 | 537801 | 1119.02 | 3.26 | 1.95 | 7.71 |
| Watermarked AES | 13622000.99 | 330443 | 340.27 | 14380258.75 | 340734 | 420.39 | 5.56 | 3.11 | 23.54 |
| SoC containing PUF IP and Locked IP | 227431733.73 | 3795375 | 1980.7 | 228189991.49 | 3805666 | 2060.82 | 0.33 | 0.27 | 4.04 |
| Average | | | | | | | 3.05 | 1.78 | 11.76 |

TABLE II

The delay overhead incurred due to the addition of the encoding and decoding logic at the Test Inputs for various benchmarks.

| | Delay (ns) | | Percentage |
|---|---|---|---|
| Design | Baseline Design | With Titan | Overhead (%) |
| Locked AES | 3.04 | 3.19 | 4.93 |
| Watermarked AES | 2.73 | 2.88 | 5.49 |
| SoC containing PUF IP and Locked IP | 10.05 | 10.18 | 1.49 |

TABLE III

The increase in area, gate count, power, and delay due to different stream cipher algorithms.

| | Baseline | | | | With Titan | | | | Percentage overheads | | | |
|---|---|---|---|---|---|---|---|---|---|---|---|---|
| Design | Delay (ns) | Power (mW) | Gate Count | Area (sq · um) | Delay (ns) | Power (mW) | Gate Count | Area (sq · um) | Delay | Power | Gate Count | Area |
| Locked AES with HC | 3.04 | 1038.9 | 527510 | 23216772.18 | 3.19 | 1039.49 | 527567 | 23220280.71 | 4.93 | 0.05 | 0.01 | 0.01 |
| Locked AES with Trivium | 3.04 | 1038.9 | 527510 | 23216772.18 | 3.19 | 1046.65 | 529386 | 23346488.3 | 4.93 | 0.75 | 0.36 | 0.56 |
| Locked AES with Grain | 3.04 | 1038.9 | 527510 | 2321677.18 | 3.19 | 1119.02 | 537801 | 22875029.94 | 4.93 | 7.71 | 1.95 | 2.84 |

Security Guarantees of TITAN

The overall security guarantees offered by the TITAN module is analyzed. The security guarantees provided by stream cipher logic is first quantified and then the complexity of the attacker to tamper with or undermine the TITAN scheme is mathematically quantified.

Security Guarantees of Stream Cipher

To quantify the security of the stream cipher, the resilience of the stream cipher against three different attacks i) Chosen Text attacks, ii) Key reuse attacks, and iii) Chosen Key attacks is analyzed.

Chosen Text Attacks: In a chosen text attack, the attacker tries to inject a known input and observes the encoded output to recover the key. In the TITAN implementation, both the inputs and outputs are encoded with different key values. Thus the attacker cannot observe the direct correlation of the encoded output with a known input vector. Additionally, the seed key register is configured during the provisioning phase, thus enabling the design house to use different key values for different ICs if needed, thus reducing the inter-IC correlation.

Key Reuse Attacks: In a key reuse attack, the attacker uses two different output values encoded using the same key to recover the unencoded bits. In TITAN, the key bits used for encoding/decoding operations at the inputs vary every cycle, thus rendering the possibility of key reuse attack infeasible.

Chosen Key Attack: In this scenario, the attacker programs the stream cipher with their chosen seed values, thus controlling the output values of the stream cipher. However, since the input vectors such as unlocking keys, test patterns, and challenge vectors are encoded by the design house using the key values generated by a valid seed combination, a mismatch in the initial seed values would cause the assets to be decoded incorrectly and impact the provisioning process. Thus, the chosen key attack does not provide the attacker with any significant advantage nor leak any secret information.

Security Analysis of TITAN Architecture

The security guarantees offered by TITAN against some attacks is analyzed.

Brute force asset recovery attack: The TITAN framework takes in the output vectors and encodes them using the key bits generated by the Encoding Unit. For a circuit with N input bits, the internal logic of the circuit is represented using Equation 1.

$$Y_{intermediate}^i = \mathcal{F}(X^i) \quad (1)$$

The output encoding operation can be represented using Equation 2, where $Y_{out}^i$ represents the encoded output and $G_{encode}$ represents the encoding operation and $K_{encode}^i$ represents the encoding key.

$$Y_{out}^i = \mathcal{G}_{encode}(\mathcal{F}(X^i), K_{encode}^i) \quad (2)$$

In the case of provisioning a security asset say unlocking keys, the logic function F involves an additional unlocking Key $K_{unlocking}$ and can thus be represented using Equation 3.

$$Y_{out}^i = \mathcal{G}_{encode}(\mathcal{F}(X^i, K_{unlocking}^i), K_{encode}^i) \quad (3)$$

Thus, to compromise the integrity of the overall circuit, the attacker would need to compromise the unlocking key or the encoding key. In the implementation, a sequential locking scheme described is used, and the unlocking operation consists of a sequence of 'M' vectors each of length 'N' applied in sequence. The probability of guessing the i-th Key vector is given by Equation 4.

$$Prob_{key}^i = \frac{1}{2^N} \quad (4)$$

Since the overall unlocking operation relies on the 'M' vectors applied in sequence, the overall probability of guessing the unlocking key can be obtained by Equation 5.

$$Prob_{unlocking} = \frac{1}{2^{N \times M}} \quad (5)$$

Since the encoding key is varied every cycle, the attacker cannot perform a correlation attack to recover the $K_{encode}$ bits and can only perform a brute force guess to recover the Key bits. Thus for an output sequence of length $N_{out}$ the probability of guessing the encoding key is given by Equation 6.

$$Prob_{key_{encode}}^i = \frac{1}{2^{N_{out}}} \quad (6)$$

Thus to successfully compromise the overall scheme, the attacker would either have to guess the unlocking keys, or $Y_{out}^i$. The probability of successfully guessing the output bits is given by Equation 9.

$$Prob_{success}^i = Prob_{key_{encode}}^i \times Prob_{unlocking} \quad (7)$$

$$Prob_{success}^i = \frac{1}{2^{N_{out}}} \times \frac{1}{2^{N \times M}} \quad (8)$$

$$Prob_{success}^i = \frac{1}{2^{N_{out} \times N \times M}} \quad (9)$$

A 4012 256-bit unlocking vectors is used in the locked AES implementation to produce 128-bit output. Thus the attacker requires $2^{131465216}$ trials to break the TITAN provisioning scheme.

Impersonation Attack: A successful impersonation or counterfeiting attack relies on the ability of the attacker to obtain structural and functional information regarding the security assets in the design. The TITAN provisioning scheme eliminates the attacker's capability to observe the internal nodes of the circuit in the test and provisioning mode. Thus the attacker cannot obtain information regarding the structural and functional aspects of the security assets.

Hijacking Attack: Due to the encoded nature of the inputs and outputs, any partial information obtained by the attacker through snooping is useless since the attacker does not possess the decoding/encoding key. The key vectors are generated by stream cipher logic at runtime, thus making it harder for the attacker to obtain them beforehand. Additionally, the seed key register is provisioned only during the provisioning phase and can vary across multiple ICs. This makes it harder for the attacker to carry out a snooping/hijacking attack.

Collusion Attack: In a collusion attack, the attacker in the foundry could leak the structural information of the design, which the attacker in the testing facility could then use in the testing facility to craft targeted input patterns. In TITAN, the tap connections in the decoding logic and the encoding logic are programmed during the provisioning phase. Thus the attacker in the foundry does not have access to the configuration of the LFSR logic. This renders the possibility of the foundry-level attacker leaking the secret assets impossible.

Conversely, the attacker in the testing facility could leak security assets such as challenge-response pairs, which the attacker in the foundry could use to produce counterfeit or fake variants of the security assets. However, the attacker in the testing facility does not have access to the unencoded security assets such as challenge-response pairs thus rendering the above scenario infeasible.

It is also shown that TITAN has the following properties.

Accessibility: Titan allows the testing facility to perform the testing process. Titan does not restrict the controllability and observability of the Design-under-Test at any point. Thus does not hamper design productivity.

Verifiability: TITAN allows the AMI to verify the integrity of the testing process. The logging module in TITAN stores the test information such as device ID, applied test patterns, and the observed outcome. The logging module also stores other meta-data such as the identity of the testing facility, time of test, and tester ID. These data would enable the AMI to conduct an audit of the testing facility and the testing process.

Adaptability: Designs with different security requirements could get tested by the same testing facility. For example, an unlocked design with an authentication module would require different security policies than a locked design with a watermark. TITAN allows the AMI to specify the degree of a security audit performed on the design before testing.

Access Control: In case of malicious activity, TITAN can restrict the testing facility from gaining access to the unprovisioned devices until further security measures are undertaken. The AMI can implement these policies remotely via the AMI.

Overheads: It can be seen from Table I and Table II that TITAN incurs minimal hardware overheads and does not significantly impact the test-time.

Physically Secure Enclosure

Figure 12:
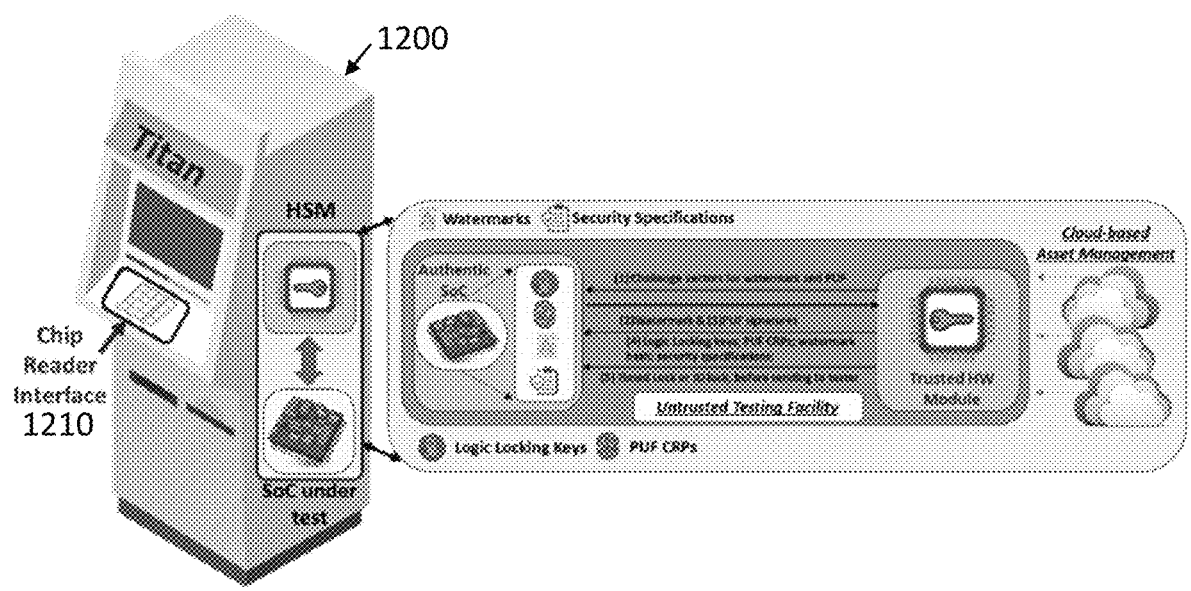
FIG. 12 shows a physical enclosure adapted to enable secure provisioning and testing of an IC, in accordance with one embodiment of the present invention.

In accordance with another embodiment of the present invention, a simple yet failproof solution to limit attacker's access to the ICs during provisioning is the usage of a secure, physical enclosure, such as physical enclosure 1200 shown in FIG. 12, that acts as a trusted element in the zero trust environment. Physical enclosure 1200 is shown as including an IC (chip) reader interface 1210 that allows the testers to insert fabricated chips to the secure housing. Once the chips are inserted into the chip reader, the testers at the rogue testing site will have zero access to the chips until the completion of the testing and provisioning process. The fully tested, provisioned, and locked ICs will only be made available to testers for shipment to the OEM once the entire set of operations are completed.

Trusted HSM as Mini-Tester

It is possible for the attackers to compromise the security of IC testing and provisioning process in an untrusted testing site despite the presence of a HSM as the root of trust. In accordance with one aspect of the present invention, the trusted HSM is located inside the secure enclosure and made compatible to the chip reader interface. Upon receiving the IC under test, HSM initiates a secure communication channel with the AMI to retrieve the assets on-demand and provision those to the target chip. The HSM also allows it to be augmented for supporting basic functional/structural testing features for chips inserted into the secure chip reader housed in an enclosure. Thus, the secure enclosure of embodiments of the present invention provide an added layer of security to the communication between the HSM, AMI, and ICs, and ensure the authenticity of preliminary test results.

IC Metering

The lack of OEM's control over the fabricated chips is a critical security issues and leads to series of attack scenarios that violate the integrity of the IC supply-chain. The IC metering technique incorporated in embodiments of the present invention enables the manufacturer to gain improved control over the ICs in post-fabrication testing and provisioning phase, and track the SoC accurately. Embodiments of the present invention facilitate IC metering by enabling the HSM to record the PUF responses from the fabricated chips automatically during the provisioning phase. These responses obtained from the ICs help to leverage the unclonable nature of PUF signatures and employ a strong passive IC metering technique. HSM sends the metered PUF responses back to the AMI so that OEM can easily access the responses and actively monitor the chips being tested and provisioned. Such IC metering prevents any attempt of the attackers at the untrusted testing site to overproduce ICs by fabricating test and yield results.

Timed I/O Lock

Exposed I/O interface of a provisioned IC is a major attack surface that can be exploited by malicious entities in the untrusted testing site; hence, it is crucial to restrict attacker's access to the chip via I/O interface once the assets are provisioned. In accordance with one aspect of the present invention, a timed I/O lock mechanism locks the provisioned ICs. The timed lock mechanism restricts attackers' access to the I/O interface by locking it after a pre-specified number of clock cycles required for testing and provisioning. Timed I/O locks may be implemented using clock antifuse based sensors. Such sensors include a counter to keep track of the cycle count, and an embedded antifuse memory block where the cycle information is stored continuously. The one time programmable nature of the antifuse memory eliminates any possibility of data fabrication. Since the counter can record the cycle count of the IC system clock, the locking mechanism can be programmed to auto-lock mode once the pre-specific number of clock cycles are reached from the time the chip is powered up for the first time. The clock antifuse based locks also enable an OEM to configure the testing and provisioning time and clock cycle measurement scale based on the requirements of the IC under test. The low overhead of clock antifuse based sensors facilitates the implementation of the locking mechanism with minimal changes to the original architecture.

Protection Against Attacks During Testing & Provisioning Using Physically Secure Enclosure Asset Extraction via Clone SoC: some embodiments of the present invention prevent attacker's attempt to steal IC assets via clone chips. Although an attacker is not prevented from inserting a fake/clone IC to the secure housing provided by some embodiments of the present invention, the timed lock eliminates the attacker's ability to boot the fake chip and extract the secrets once the provisioning is done. Such timed lock will also prevent the attacker from IC cloning, IP piracy, and infiltrating original IC supply chain by inserting fake chips since the IC metering technique reports every individual chip tested, and provisioned via embodiments of the present invention, thereby enabling a fine-grained control of OEM over the IC supply chain.

Asset Leakage via Man-in-the-Middle Attack: some embodiments of the present invention thwart the man-in-the-middle attack in untrusted testing site by enabling impenetrable, secure communication between HSM, cloud infrastructure, and the IC under test within the physically secure housing. An attacker will not be able to launch a man-in-the-middle attack during asset provisioning in a non-invasive manner. To the extent that some embodiments of the present invention use a structure similar to that of an ATM, any attempt to physically tamper with these embodiments of the present invention would be extremely difficult. Thus, the implementation and deployment of some embodiments of the present invention in an untrusted testing site eliminates the attackers' ability to tamper the communication channels of HSM, AMI, and chips under test, and launch a man-in-the-middle attack.

SoC Overproduction with Fabricated Tests: some embodiments of the present invention limit the attackers' ability to use tampered ATE and generate fabricated results. The timed I/O lock mechanism restricts the allotted time for the untrusted tester to perform functional and structural testing. As the IC under test automatically locks itself after the pre-specific number of clock cycles, it constraints the attackers' ability to exploit the testing period for performing unauthorized testing and generating fabricated test results with false claim of failed chips. Similarly, the constraint of clock cycle imposed by the timed I/O lock on the provisioned chips deters the attackers from attempting to illegally extract the assets in the testing phase.

Fabrication and Testing Time Attacks

Significant work has been done on fabrication time attacks over the past decade. Attacks that can circumvent traditional defense mechanisms such as logic locking and encryption-based techniques are described herein. The attackers at the foundry can analyze the encrypted design netlist and sensitize the logic locking key bits to the outputs of an unlocked IC via customized test patterns. SAT-based approach can help the attackers eliminate incorrect keys of an unlocked, encrypted design in an iterative manner and gain access to original netlist. The unlocked ICs are also vulnerable to hill climbing search attacks that employ test patterns to retrieve the locking keys by acquiring zero hamming distance between the encrypted circuitry and test responses. Similarly, the attackers can analyze the encrypted design and test patterns to determine keys with maximum fault coverage and retrieve the correct response for the provided test data.

Existing Defense Mechanisms

Defense mechanisms such as logic locking, PUF-based metering, watermarking, and the like, have been proposed over the years to mitigate the attacks at untrusted foundries and testing facilities. Majority of the logic locking approaches depend on finite state machine (FSM) based state space obfuscation. In logic locking-based defenses, the correct functionality of the design is retrieved via valid input vector that unlocks the FSM and brings the IC under test to its normal operational mode. Application of randomly inserted XOR-based key gates have also been introduced to lock and unlock ICs at the foundry. PUF-based metering and authentication enables remote locking and unlocking of ICs through unique IDs generated from each IC via PUFs. IC watermarking techniques are also developed to prevent IP piracy at untrusted foundry and testing sites via embedded watermarks that produce digital signatures. However, such IC protection schemes are not quite effective when it comes to mitigating attacks implemented in untrusted testing facilities. Since the testing facilities need to unlock the ICs to fully test the functionality and provision assets, malicious entities at the testing sites can bypass these defense mechanisms by exploiting the attack surfaces depicted in our work.

A threat model that exposes one of the weakest links of present-day IC supply-chain, as well as a solution, in accordance with some embodiments of the present invention, to mitigate the vulnerabilities stemming from it, are described above. Three attacks originating from a rogue testing facility that works in collusion with an untrusted foundry is described above. The attacks demonstrate how conventional defense mechanisms based on obfuscation, PUF-based authentication, and hardware watermarking can be circumvented by attackers during chip testing and asset provisioning. These attacks also highlight that deploying a dedicated hardware security module as the root of trust in an untrusted environment is not effective in preventing attacks during provisioning and testing.

A robust and secure framework to ensure trustworthy IC testing and provisioning, in accordance with embodiments of the present invention, despite the presence of potential attackers, is also described above. Some embodiments of the present invention, provide, among other advantages, complete physical isolation of chips under test and provisioning from untrusted entities, augmented root of trust module for improved IC metering, and compatibility to clock antifuse based locks to restrict attacker's access to the provisioned ICs.

What is claimed is:

1. A method for secure testing and provisioning of an integrated circuit (IC), the method comprising:
   configuring a secure asset provisioning hardware entity (SAPHE) module to apply unlocking key patterns to the IC;
   configuring a secure reconfigurable key provisioning architecture (SLEEVE) module disposed in the IC to, upon receiving the unlocking key patterns, generate key bits for decoding and encoding inputs and outputs of the IC;
   configuring the SAPHE module to apply a set of encoded test patterns to the SLEEVE module;
   configuring the SAPHE module to receive, from the IC, a first set of responses to the set of encoded test patterns; and
   configuring the SAPHE module to determine whether the SLEEVE module is properly configured based at least in part on the first set of responses.

2. The method of claim 1 further comprising:
   configuring the SAPHE module to, upon determining that the SLEEVE module is properly configured, apply a set of encoded provisioning vectors to the SLEEVE module;
   configuring the SAPHE module to receive, from the IC, a second set of responses to the set of encoded provisioning vectors; and
   configuring the SAPHE module to determine whether a provisioning process of the IC is successful based at least in part on the second set of responses.

3. The method of claim 2, wherein the first set of responses and the second set of responses comprise encoded responses.

4. The method of claim 2 further comprising:
   configuring the SAPHE module to fetch the set of encoded test patterns from a provisioning module disposed in the SAPHE; and
   configuring the SAPHE module to fetch the set of encoded provisioning vectors from the provisioning module.

5. The method of claim 2 further comprising:
   configuring the SAPHE module to, upon determining the success of the provisioning process, apply a set of encoded unlocking keys to the IC to unlock the functionality of the IC; and
   configuring the SAPHE module to receive a status of the IC after a testing process is applied to the IC.

6. The method of claim 5, wherein the set of encoded unlocking keys comprises a first set of encoded unlocking keys for unlocking a logic locked intellectual property (IP) block disposed in the IC.

7. The method of claim 5, wherein the set of encoded unlocking keys comprises a second set of encoded unlocking keys for unlocking a physically unclonable function (PUF) IP block disposed in the IC.

8. The method of claim 1 further comprising configuring the SAPHE module to apply a set of control signals to a security wrapper disposed in the IC to enable a provisioning mode.

9. The method of claim 1 further comprising configuring the SAPHE module to fetch the unlocking key patterns from a logging module disposed in the SAPHE module.

10. The method of claim 1 further comprising configuring the SAPHE module to establish a secure channel with a design house via a communication module disposed in the SAPHE.

* * * * *